United States Patent
Yamazaki

Patent Number: 5,216,169
Date of Patent: Jun. 1, 1993

[54] 3-HYDROXYPYRIDINEAZOMETHINE DYE

[75] Inventor: Shigeru Yamazaki, Kanagawa, Japan

[73] Assignee: Fuji Photo Film Co., Ltd., Kanagawa, Japan

[21] Appl. No.: 584,020

[22] Filed: Sep. 18, 1990

[30] Foreign Application Priority Data

Sep. 18, 1989 [JP] Japan .................. 1-240968

[51] Int. Cl.$^5$ .......................... C07D 213/74
[52] U.S. Cl. ...................... 546/292; 546/291;
546/297; 546/296; 546/293; 546/287; 546/288;
546/294; 546/295; 546/298; 546/299; 546/301;
546/302; 546/303; 546/270; 546/261; 546/264;
546/265; 546/284; 546/283; 546/281
[58] Field of Search .............. 546/292, 291, 297, 296,
546/293, 287, 288, 294, 295, 298, 299, 301, 302, 303

[56] References Cited
PUBLICATIONS
Komamura CA 115 (24) 258465b.

*Primary Examiner*—Jane T. Fan
*Attorney, Agent, or Firm*—Sughure, Mion, Zinn, Macpeak & Seas

[57] ABSTRACT

A 3-hydroxypyridineazomethine dye represented by general formula (I)

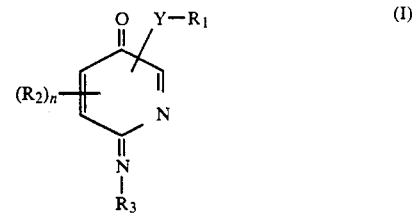

wherein $R_1$ represents an aliphatic group, an aromatic group, or a heterocyclic group; $R_2$ represents an aliphatic group, an aromatic group, a heterocyclic group, an alkoxy group, an aryloxy group, an alkenyloxy group, an amino group, an acyl group, an ester group, an amido group, a carbamoylamino group, a sulfamoylamino group, a sulfamido group, an imido group, a ureido group, an aliphatic or an aromatic sulfonyl group, an aliphatic or an aromatic thio group, a hydroxyl group, a cyano group, a carboxy group, or a halogen atom; $R_3$ represents an aryl group; Y represents a bivalent linking group containing at least one of amide bond and ester bond; n represents 0, 1 or 2; where n is 2, the two $R_2$ groups may be the same group or atom or may be mutually different groups or atoms, or the two $R_2$ groups may form a ring; where n is 1 or more, $R_1$ and $R_2$ may form a ring; and at least one of $R_1$ and $R_2$ may contain at least one residual group formed by removing $R_1$ or $R_2$ from general formula (I), as a substituent; and a method of preparing the dye by an oxidizing coupling reaction of 3-hydroxypyridine and a p-phenylenediamine or a p-aminophenol, or a dehydration condensation reaction of a 3-hydroxypyridine and a nitroso compound.

12 Claims, 4 Drawing Sheets

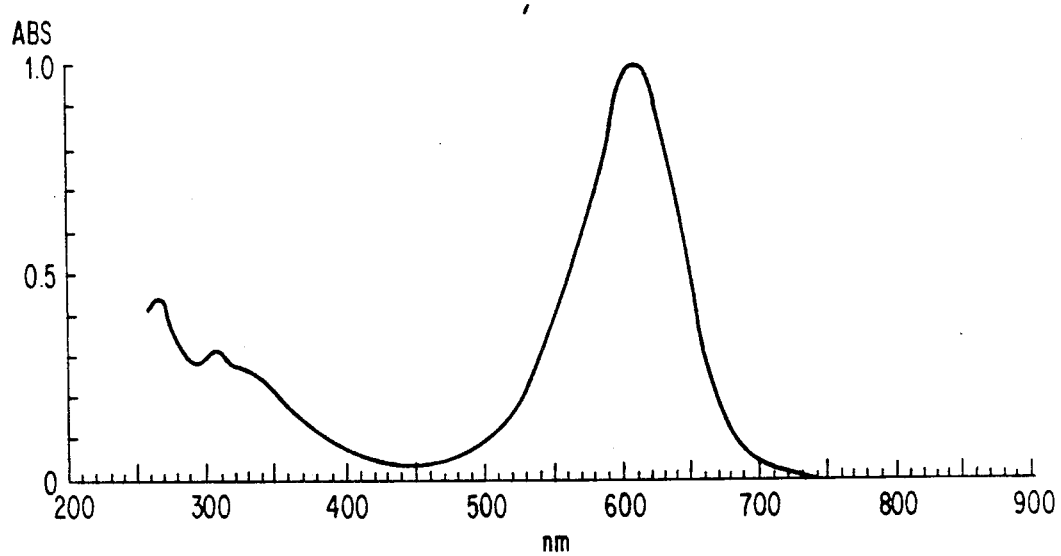

3-HYDROXYPYRIDINEAZOMETHINE DYE

FIELD OF THE INVENTION

The present invention relates to novel 3-hydroxypyridineazomethine dyes which are useful as dyes for image-forming in color photographs, color electrophotographs, ink jet systems, thermo-sensitive transfer systems, printing and the like, or as filter dyes for color photographic materials or solid-state image pick-up tubes and liquid crystal color televisions, and to their method of preparation.

BACKGROUND OF THE INVENTION

Azomethine dyes, in particular azomethine dyes with a p-dialkylaminophenyl group bonded to the nitrogen atom of an imine, are formed by means of an oxidizing coupling reaction between active methylenes or phenols and N,N-dialkyl-p-phenylenediamines. These dyes, due to the variety of their yellow, red, magenta, blue and cyan color tones, have come to be widely used as image-forming dyes in silver halide color photographic materials employing a color subtractive process using a mixture of the three colors yellow, magenta and cyan. Blue and cyan dyes are formed from phenols, naphthols or 2,4-diphenylimidazoles and the like, magenta and blue dyes are formed from 5-pyrazolones, acylacetonitriles, 1H-pyrazolo[1,5-a]-benzimidazoles, 1H-pyrazolo[5,1-c]-1,2,4-triazoles, 1H-pyrazolo[2,3-b]-1,2,4-triazoles and the like, and yellow dyes are formed from acylacetanilides, diacylmethanes, malondianilides and the like. Dyes of this kind are disclosed in, for example, JP-A-60-186567, JP-A-63-145281, and JP-A-63-113077 (the term "JP-A" as used herein means an "unexamined published Japanese patent application").

Recent years have seen the introduction of new color image-forming methods such as color electrophotography, ink-jet systems, and thermo-sensitive transfer systems, and at the same time demand is increasing for filters for liquid crystal color televisions and solid-state image pick-up tubes in tandem with developments in electronic imaging, so that azomethine dyes are being studied and applied not only in color photographs but in a variety of systems and products.

Conventional azomethine dyes often suffer from defects in that they require a large number of production processes, are costly, and lack stability. Accordingly there has been a strong demand for improvement.

SUMMARY OF THE INVENTION

A first object of the invention is to provide a novel 3-hydroxypyridineazomethine dye.

A second object of the invention is to provide a low-cost 3-hydroxypyridineazomethine dye for which few production process steps are required.

A third object of the invention is to provide 3-hydroxypyridineazomethine dye having superior stability, particularly with respect to heat.

A fourth object of the invention is to provide a method of preparation for this novel, high-quality 3-hydroxypyridineazomethine dye.

As a result of painstaking research into the development of azomethine dyes satisfying the above objects, the inventors have been able to achieve the above objects by means of the 3-hydroxypyridineazomethine dye shown in general formula (I) below:

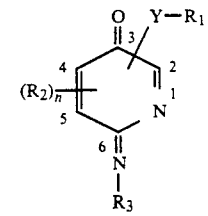

In the formula, $R_1$ represents an aliphatic group, an aromatic group, or a heterocyclic group; $R_2$ represents an aliphatic group, an aromatic group, a heterocyclic group, an alkoxy group, an aryloxy group, an alkenyloxy group, an amino group, an acyl group, an ester group, an amido group, a carbamoylamino group, a sulfamoylamino group, an imido group, an ureido group, an aliphatic or an aromatic sulfonyl group, an aliphatic or an aromatic thio group, a hydroxyl group, a cyano group, a carboxy group, or a halogen atom; $R_3$ represents an aryl group; Y represents a bivalent linking group containing at least one amide bond and/or ester bond; n represents 0, 1 or 2; where n is 2, the two $R_2$ groups may be the same group or atom or may be mutually different groups or atoms, or the two $R_2$ groups may form a ring; and where n is 1 or more, $R_1$ and $R_2$ may form a ring.

BRIEF DESCRIPTION OF THE DRAWINGS

FIGS. 1–7 show respectively the visible absorption spectra for Illustrative Compounds 1, 2, 3, 4, 5, 6 and 7 obtained in the Examples described later.

DETAILED DESCRIPTION OF THE INVENTION

Figure 1:
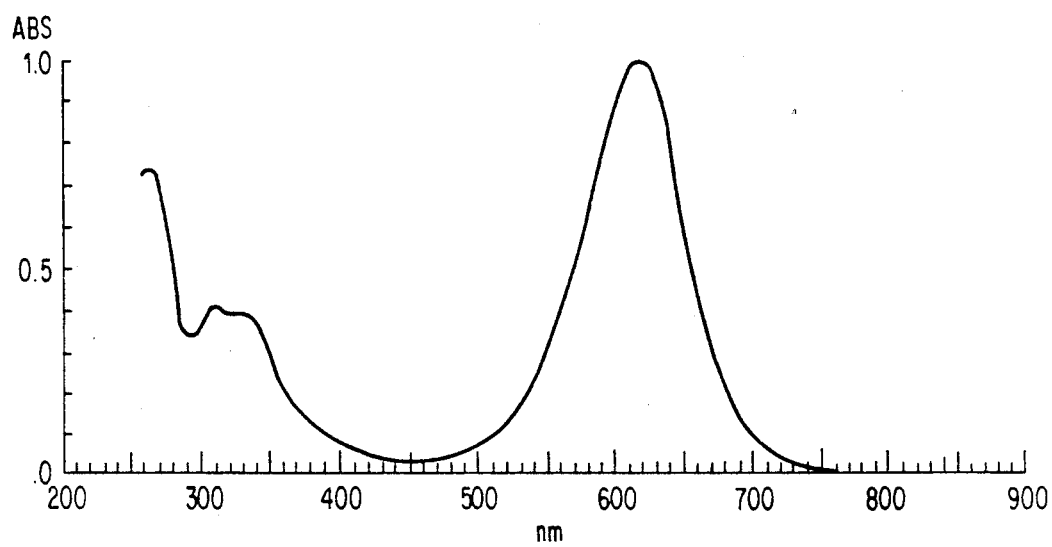
Figure 2:
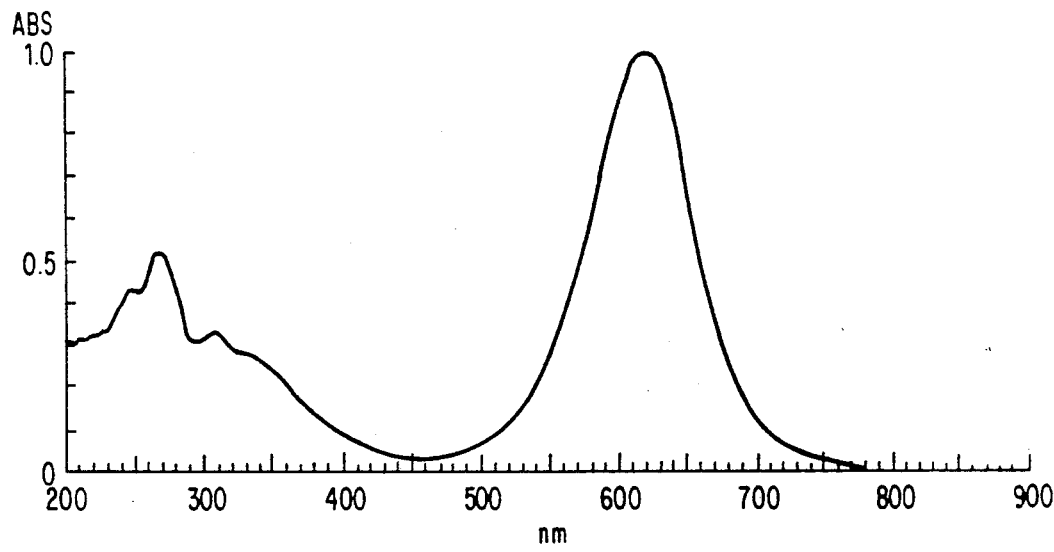
Figure 3:
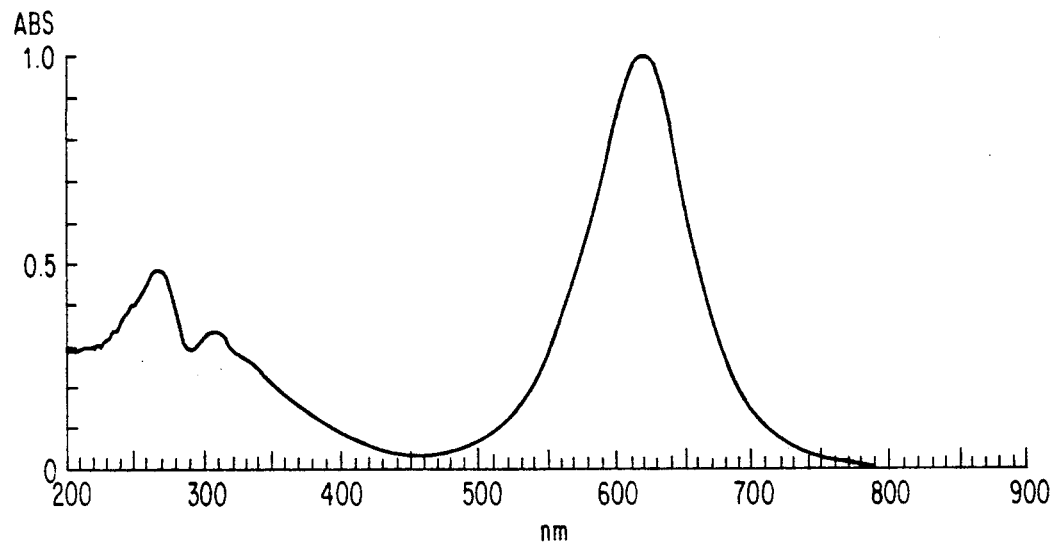
Figure 4:
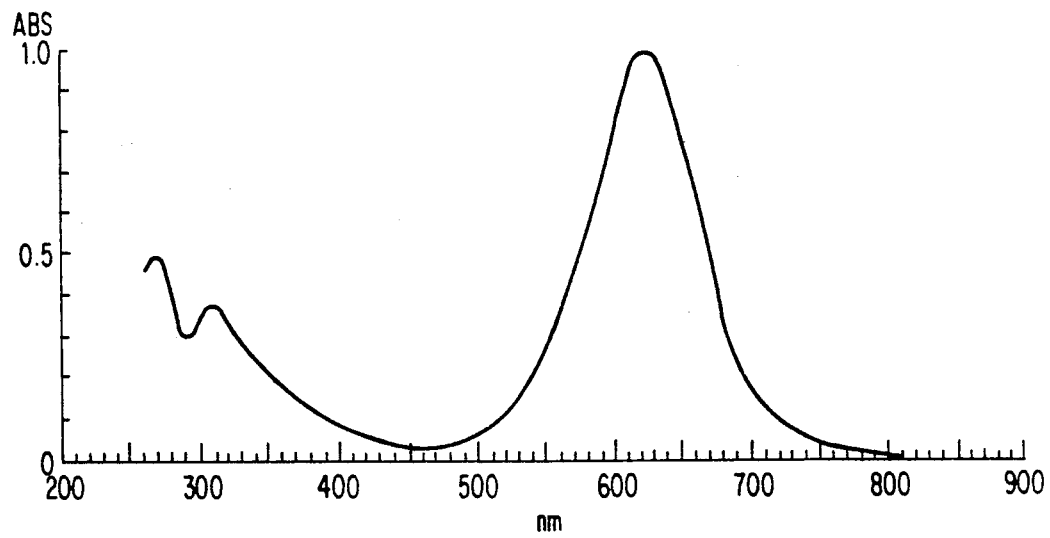
Figure 5:
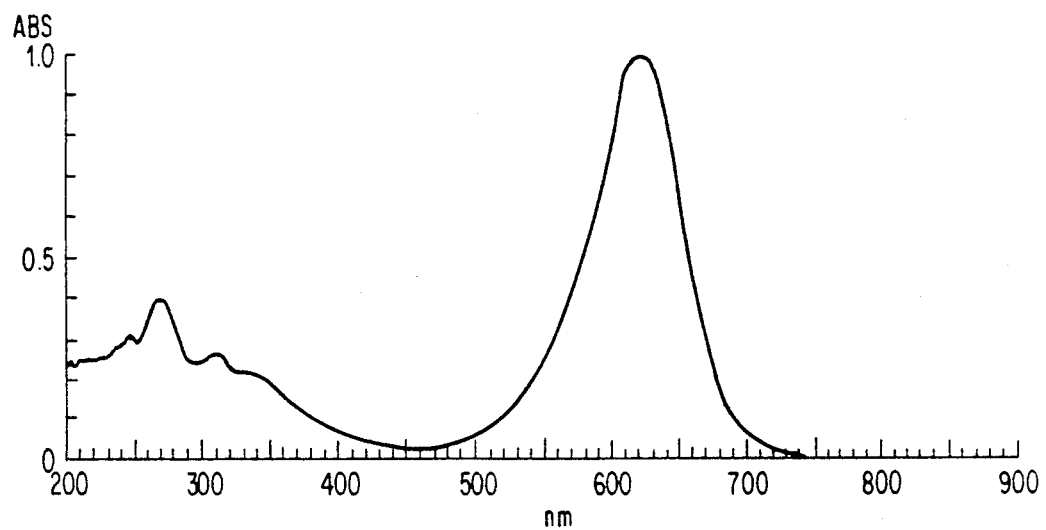
Figure 6:
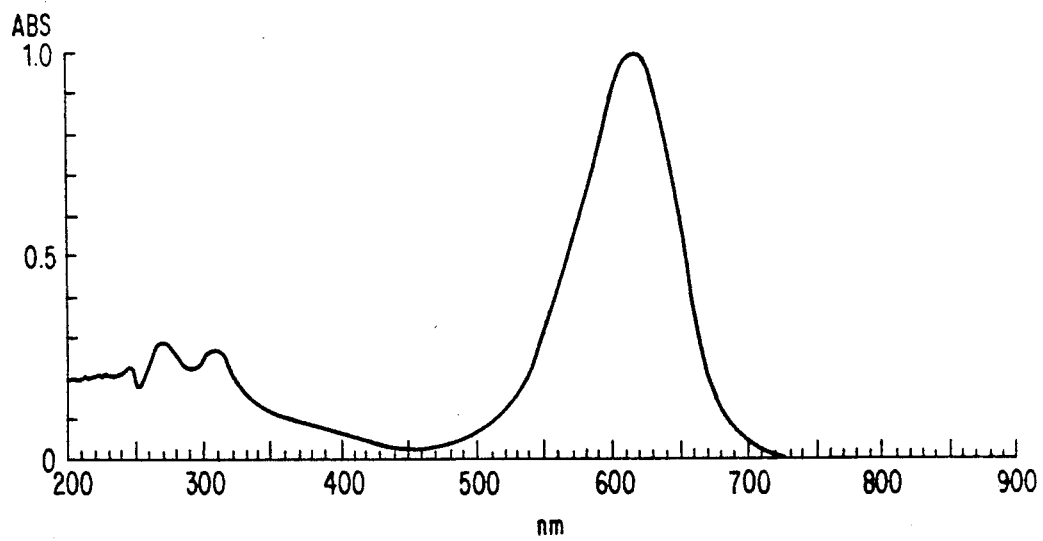

3-Hydroxypyridineazomethine dye of the present invention is a dye which is derived by an oxidizing coupling reaction of a 3-hydroxypyridine compound.

In general formula (I), $R_1$ represents an aliphatic group preferably with a carbon number of 1 to 36 (containing the carbon number of substituent; the same hereinafter), an aromatic group preferably with a carbon number of 6 to 36 (for example, phenyl, naphthyl), or a heterocyclic group preferably with a carbon number of 1 to 36 (for example, 2-, 3-, 4-pyridyl, 2-, or 3-furyl, 1-, 2-, or 3-pyrrolyl, 2- or 3-thiofuryl, benzothiazolyl, morpholino).

The term "aliphatic group" as used in this specification denotes an aliphatic hydrocarbon straight chain, branched chain or ring, and include saturated and unsaturated groups such as alkyl, alkenyl and alkynyl groups. Typical examples are methyl, ethyl, butyl, dodecyl, octadecyl, icosenyl, isopropyl, tert-butyl, tert-octyl, tert-dodecyl, cyclohexyl, cyclopentyl, allyl, vinyl, 2-hexadecenyl and propargyl.

The term "aromatic group" denotes a monocyclic or polycyclic fused aromatic hydrocarbon group (preferably up to 4 fused rings).

The term "heterocyclic group" denotes a ring group including not only carbon atoms but also at least one hetero atom such as O, S, N or P within the ring.

A heterocyclic group may contain a 3–8 member heterocyclic ring, preferably a 5 or 6 member ring, in a single unit. Moreover, heterocyclic rings may fuse together, or they may fuse with a benzene ring. Non-aromatic ring groups are also included within the term "heterocyclic groups".

The aliphatic groups, aromatic groups and heterocyclic groups represented by $R_1$ may be substituted with a group selected from among the following (which may be further substituted with such substituents), for example: an alkyl group, an aryl group, a heterocyclic group, an alkoxy group (for example, methoxy, 2-methoxyethoxy), an aryloxy group (for example, 2,4-di-tert-amylphenoxy, 2-chlorophenoxy, 4-cyanophenoxy), an alkenyloxy group (for example, 2-propenyloxy), an amino group (for example, butylamino, dimethylamino, anilino, N-methylanilino), an acyl group (for example, acetyl, benzoyl), an ester group (for example, butoxycarbonyl, phenoxycarbonyl, acetoxy, benzoyloxy, butoxysulfonyl, toluenesulfonyloxy), an amido group (for example, acetamido, ethylcarbamoyl, dimethylcarbamoyl, methanesulfonamido, butylsulfamoyl), a sulfamoylamino group (for example, dipropylsulfamoylamino), a carbamoylamino group (for example, dimethylcarbamoylamino), an imido group (for example, succinimido, hydantoinyl), an ureido group (for example, phenylureido, dimethylureido), an aliphatic or an aromatic sulfonyl group (for example, methanesulfonyl, phenylsulfonyl), an aliphatic or an aromatic thio group (for example, ethylthio, phenylthio), a hydroxy group, a cyano group, a carboxy group, a nitro group, a sulfo group or a halogen atom.

$R_1$ is preferably a lower alkyl group having carbon atom of 1 to 5, a phenyl group, or a phenyl group substituted with an alkoxy group or a halogen atom.

The following may be cited as preferred specific examples of $R_2$ in general formula (I): an aliphatic group (for example, methyl, ethyl, butyl, dodecyl and the like), an aromatic group (for example, phenyl, naphthyl), a heterocyclic group (for example, 2-, 3-, or 4-pyridyl, 2- or 3-furyl, 1-, 2-, or 3-pyrrolyl, 2- or 3-thiofuryl, benzothizolyl, morpholino), an alkoxy group (for example, methoxy, 2-methoxyethoxy), an aryloxy group (for example, 2,4-di-tert-amylphenoxy, 2-chlorophenoxy, 4- cyanophenoxy), an alkenyloxy group (for example, 2-propenyloxy), an amino group (for example, butylamino, dimethylamino, anilino, N-methylanilino), an acyl group (for example, acetyl, benzoyl), an ester group (for example, butoxycarbonyl, phenoxycarbonyl, acetoxy, benzoyloxy, butoxysulfonyl, toluenesulfonyloxy), an amido group (for example, aacetamido, ethylcarbamoyl, dimethylcarbamoyl, methanesulfonamido, butylsulfamoyl), a sulfamoylamino group (for example, dipropylsulfamoylamino), an imido group (for example, succinimido, hydantoinyl), a ureido group, an aliphatic or an aromatic sulfonyl group, an aliphatic or an aromatic thio group, a hydroxy group, a cyano group, a carboxy group or a halogen atom. Especially preferred example is a substituted or unsubstituted acylamino group derived from an acyl group having 2 to 20 carbon atoms.

The specific examples of substituents for groups cited above are the same as the specific examples given with respect to $R_1$.

$R_2$ may be bonded at the 2-, 4- or 5-position of the ring.

In general formula (I), Y is a bivalent linking group containing at least an amide bond or an ester bond. Specific examples of Y include the following:

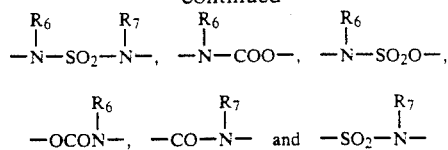

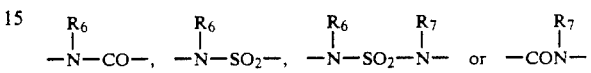

Here, $R_6$ and $R_7$ each represents a hydrogen atom, an aliphatic group, an aromatic group or a heterocyclic group. These groups may be substituted with substituents which are cited for $R_1$.

In general formula (I), Y is preferably

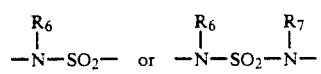

and is more preferably —NHCO—

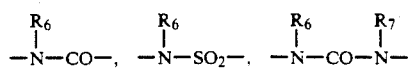

bonds to the pyridine ring at the nitrogen atom.

In formula (I) Y may be bonded at the 2-, 4- or 5-position, preferably at the 2-position of the ring.

In general formula (I), when a ring is formed by $R_1$ and $R_2$ or by $R_2$ by itself, the preferred number of ring members is from 5–7, with 5 and 6 members being still more preferable, and the ring may be a carbon ring or a ring containing N or O atoms, and may be either aromatic or non-aromatic.

In general formula (I), preferred specific examples of $R_3$ include the following: an aryl group with a carbon number of 6–24 (for example, phenyl, 4-methoxyphenyl, 4-chlorophenyl, 4-dimethylaminophenyl, 4-diethylaminophenyl, 4-diethylamino-2-methylphenyl, 4-[N-ethyl-N-(2-hydroxyethyl)amino]-2-methylphenyl, 4-[N-methyl-N-(2-methanesulfonamidoethyl)amino]-2-methylphenyl, 4-hydroxyphenyl).

In the dyes according to the invention and represented by general formula (I), at least one of $R_1$ and $R_2$ may contain 1 or 2 or more residual groups formed by removing $R_1$ or $R_2$ from general formula (I), as substituent groups. In other words, the dyes according to the invention include oligomers and polymers in which at least one of $R_1$ and $R_2$ contains at least one residual group represented by

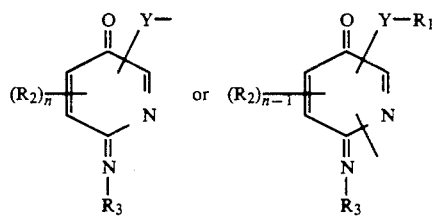

Dyes of the present invention which contain one residual group removing $R_1$ or $R_2$ from general formula (I) will be termed "dimers", and those which contain two "trimers". As for polymers, examples can be cited of vinyl-based polymers in which $R_1$ or $R_2$ contains at least one of the above two types of residual group, the numerical average degree of polymerization in the polymer capable of being, for example, approximately 10–1,000.

An espcially preferred form of the 3-hydroxypyridineazomethine dye of this invention is represented by general formula (II) below.

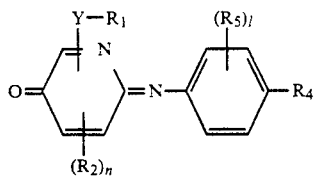

In general formula (II), $R_1$, $R_2$, Y and n are the same as in general formula (I), $R_4$ represents a substituted or unsubstituted amino group or hydroxyl group, $R_5$ represents a halogen atom, an alkyl group, an alkoxy group, a carbonamido group, a sulfonamido group, or an alkoxycarbonylamino group, and l is an integer from 0–4. However, when l is a plural number, the $R_5$ groups may be the same or different. The group or groups represented by $R_5$ may be bonded at any position of the benzene ring.

The 3-hydroxypyridineazomethine dye represented by general formula (I) or (II) may give a variety of color tones such as magenta, blue, cyan and violet depending on the dispersion conditions and/or selection of the substituent groups $R_1$, $R_2$, Y, $R_4$ and $R_5$, the numbers of n and l, and the positions of Y, $R_2$ and $R_5$ on the rings.

Specific examples of chemical compounds for the 3-hydroxypyridineazomethine dyes of the invention are given below by Illustrative Compounds 1 to 56, but the invention is not limited to these.

| No. | n | Y | $R_1$ | $R_2$ | $R_3$ |
|---|---|---|---|---|---|
| 1 | 1 | NHCO | -⟨◯⟩-OCH₃ | 5-(t)C₅H₁₁-⟨◯⟩-OCHCONH- with C₂H₅ and C₅H₁₁(t) | CH₃-⟨◯⟩-N(C₂H₅)(CH₂)₂NHSO₂CH₃ |
| 2 | 1 | NHCO | -⟨◯⟩ | as above | as above |
| 3 | 1 | NHCO | Cl-⟨◯⟩ | as above | as above |
| 4 | 1 | NHCO | Cl,Cl-⟨◯⟩ (2,4-diCl) | as above | as above |
| 5 | 1 | NHCO | -⟨◯⟩ | 5-(t)-C₄H₉CONH | CH₃-⟨◯⟩-N(C₂H₅)₂ |
| 6 | 1 | NHCO | (t)C₄H₉ | 5-(t)C₄H₉CONH- | CH₃-⟨◯⟩-N(C₂H₅)₂ |

-continued

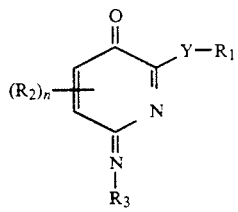

| No. | n | Y | R₁ | R₂ | R₃ |
|---|---|---|---|---|---|
| 7 | 1 | NHCO | 4-tolyl | 5-(C₆H₁₃)(C₈H₁₇)CHCONH— | 3-CH₃-4-[N(C₂H₅)(CH₂)₂NHSO₂CH₃]phenyl |
| 8 | 1 | NHCO | pentafluorophenyl | 5-(t)C₅H₁₁-phenyl, 2-C₅H₁₁(t), OCH(C₂H₅)CONH— | as above |
| 9 | 1 | NHCO | 2,4,6-trichlorophenyl | as above | 3-CH₃-4-[N(C₂H₅)CH₂CH₂OH]phenyl |
| 10 | 1 | NHCO | 3,4-dimethoxyphenyl | 5-(t)C₅H₁₁-phenyl, 2-C₅H₁₁(t), OCH(C₄H₉(n))CONH— | as above |
| 11 | 1 | NHCO | (t)C₄H₉ | 5-(n)C₁₅H₃₁CONH— | 3-CH₃-4-[N(C₂H₅)(CH₂)₂NHSO₂CH₃]phenyl |
| 12 | 1 | NHCO | 4-pyridyl | 5-(n)C₁₆H₃₃SO₂—CH(C₃H₇(i))CONH— | 3-CH₃-4-[N(C₂H₅)(CH₂)₂NHSO₂CH₃]phenyl |
| 13 | 1 | NHCO | 2-methyl-6-OC₁₄H₂₉-phenyl | 5-Cl | 3-CH₃-4-[N(C₂H₅)(CH₂)₂NHSO₂CH₃]phenyl |
| 14 | 1 | NHSO₂ | phenyl | 5-(t)C₈H₁₇-phenyl, 2-C₈H₁₇(t), O—CH(C₆H₁₃(n))CONH— | 3-CH₃-4-[N(C₂H₅)(CH₂)₂NHSO₂CH₃]phenyl |

-continued

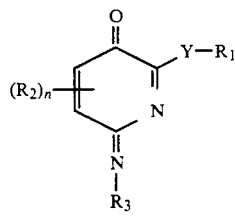

| No. | n | Y | $R_1$ | $R_2$ | $R_3$ |
|---|---|---|---|---|---|
| 15 | 1 | $NHSO_2$ | $(t)C_4H_9$ | 5-$(t)C_5H_{11}$, 2-Cl phenyl, $OCH(C_6H_{13}(n))CONH-$ | 3-$CH_3$, 4-$N(C_2H_5)((CH_2)_2NHSO_2CH_3)$ phenyl |
| 16 | 1 | NHCO | 3-$NHSO_2CH_3$ phenyl | 5-$CH_3$, 2-$C_{10}H_{21}(n)$ phenyl, $OCH_2CONH-$ | 3-$CH_3$, 4-$N(C_2H_5)(CH_2CH_2OH)$ phenyl |
| 17 | 1 | $NHSO_2$ | 3-$NHSO_2CH_3$ phenyl | 5-NC, 2-$C_{10}H_{12}(n)$ phenyl, $OCH-CONH-$ | 3-$CH_3$, 4-$N(C_2H_5)((CH_2)_2NHSO_2CH_3)$ phenyl |
| 18 | 1 | $NHSO_2$ | 2,3-diCl phenyl | 5-$(t)C_8H_{17}$, 2-$C_8H_{17}(t)$ phenyl, $OCH(C_4H_9(n))CONH-$ | 3-$CH_3$, 4-$N(C_2H_5)((CH_2)_2NHSO_2CH_3)$ phenyl |
| 18 | 1 | $NHSO_2$ | 4-CN phenyl | 5-$(t)C_8H_{17}$, 2-$C_8H_{17}(t)$ phenyl, $OCH(C_2H_5)CONH-$ | as above |
| 20 | 1 | $NHSO_2$ | $(t)C_4H_9$ | 5-$(t)C_4H_9CONH-$ | as above |
| 21 | 1 | NHCONH | 4-CN phenyl | 5-$(t)C_8H_{17}$, 2-$C_8H_{17}(t)$ phenyl, $OCH_2CONH-$ | as above |
| 22 | 1 | NHCONH | $(t)C_5H_{11}$ | 5-$(t)C_5H_{11}$, 2-$C_5H_{11}(t)$ phenyl, $OCH(C_6H_{13}(n))CONH-$ | as above |
| 23 | 1 | NHCONH | pentafluorophenyl | 5-$(t)C_5H_{11}$, 2-$C_5H_{11}(t)$ phenyl, $OCH(C_4H_9(n))CONH-$ | as above |

-continued

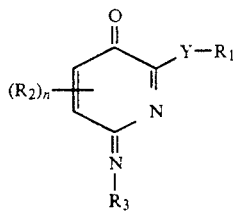

| No. | n | Y | R₁ | R₂ | R₃ |
|---|---|---|---|---|---|
| 24 | 1 | NHCONH | 3,4-dichlorophenyl | 5-(t)C₅H₁₁, 2-[OCH(C₂H₅)CONH-], C₅H₁₁(t) | 3-CH₃, 4-[N(C₂H₅)(CH₂)₂NHSO₂CH₃]phenyl |
| 25 | 1 | NHCONH | 4-chloro-2-methylbenzothiazolyl | 5-(t)C₅H₁₁, 2-(OCH₂CONH-), C₅H₁₁(t) | as above |
| 26 | 1 | NHCONH | 4-cyanophenyl | 5-(t)C₅H₁₁, 2-[OCH(C₂H₅)CONH-], C₅H₁₁(t) | as above |
| 27 | 2 | NHCO | CH₃ | 4-Cl, 5-CH₃ | 4-[N(CH₂CH₃)₂]phenyl |
| 28 | 2 | NHCO | CH₃ | 4-Cl, 5-C₂H₅ | 4-[N(CH₂CH₂CN)₂]phenyl |
| 29 | 2 | NHCO | C₂H₅ | 4-Cl, 5-C₂H₅ | 4-[N(C₃H₇)₂]phenyl |
| 30 | 1 | NHCO | C₃H₇(i) | 5-CH₃CONH— | 3-CH₃, 4-[N(CH₃)₂]phenyl |
| 31 | 2 | NHCO | (t)C₄H₉ | 4-Cl, 5-CH₃ | 3-F, 4-[N(C₄H₉)₂]phenyl |
| 32 | 2 | NHCO | CH₃ | 4-Cl, 5-C₂H₅ | 3-OCH₃, 4-(NHC₂H₅)phenyl |
| 33 | 1 | NHCO | CH₃ | 5-C₂H₅ | 3-NHCOCH₃, 4-(NHC₂H₅)phenyl |

-continued

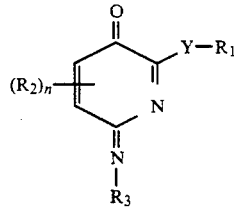

| No. | n | Y | R₁ | R₂ | R₃ |
|---|---|---|---|---|---|
| 34 | 2 | NHCO | CH₃ | 4-Cl, 5-C₂H₅ | 4-(NHCOOCH₃)-2-CH₃-phenyl-N(C₂H₅)((CH₂)₂CO₂C₂H₅) |
| 35 | 1 | NHCO | phenyl | 5-C₂H₅ | 4-hydroxyphenyl |
| 36 | 2 | NHCO | phenyl | 4-Cl, 5-CH₃ | 3-CH₃-phenyl-N(C₂H₅)(CH₂CH₂CN) |
| 37 | 1 | NHCO | phenyl | 5-CH₃ | phenyl-N(C₂H₅)(CH₂CH₂OCH₃) |
| 38 | 2 | NHCO | 2-furyl | 4-Cl, 5-CH₃ | phenyl-N(C₂H₅)₂ |
| 39 | 2 | NHCO | 2-furyl | 4-Cl, 5-C₂H₅ | phenyl-N(C₂H₅)(CH₂CH₂OCH₃) |
| 40 | 1 | NHCO | 2-furyl | 5-C₂H₅CONH— | phenyl-N(C₂H₅)(CH₂CH₂OCOCH₃) |
| 41 | 1 | NHCO | 2-furyl | 5-(t)-C₄H₉CONH— | phenyl-N(C₂H₅)₂ |
| 42 | 1 | NHCO | 2-furyl | 5-CH₃ | phenyl-N(C₂H₅)(CH₂CH₂OH) |
| 43 | 1 | NHCONH | 2-thienyl | 5-(n)C₃H₇CONH | phenyl-N(C₂H₅)₂ |
| 44 | 2 | NHCONH | 2-pyridyl | 4-Cl, 5-C₂H₅ | phenyl-N(C₂H₅)(CH₂CH₂SO₃H) |

-continued

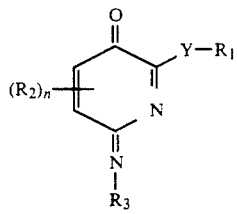

| No. | n | Y | R₁ | R₂ | R₃ |
|---|---|---|---|---|---|
| 45 | 2 | NHCONH | 3-pyridyl | 4-Cl, 5-CH₃CONH— | 3-CH₃-4-[N(C₂H₅)(CH₂CH₂SO₂CH₃)]phenyl |
| 46 | 2 | NHCONH | 4-pyridyl | CH=CH-CH=CH (fused) | 4-[N(C₂H₅)₂]phenyl |
| 47 | 2 | NHCONH | cyclohexyl | (CH₃)₃C-CH₂-C(=O)-NH— | 3-CH₃-4-[N(C₂H₅)₂]phenyl |
| 48 | 2 | NHSO₂ | —CH₂-C₆H₅ | 4-CH₃, 5-CH₃ | 4-[N(C₂H₄OCOCH₃)₂]phenyl |
| 49 | 1 | NHSO₂ | —CF₃ | 5-CH₃CONH— | 4-[N(C₂H₅)₂]phenyl |
| 50 | 2 | NHSO₂ | —C₃F₇ | 4-Cl, 5-C₂H₅ | 4-[N(C₂H₅)₂]phenyl |
| 51 | 2 | NHSO₂NH— | —C₃F₇ | 4-Cl, 5-CH₃CONH— | 4-[N(C₂H₅)₂]phenyl |
| 52 | 1 | NHSO₂ | —CH₃ | 5-succinimido | 4-[N(C₂H₅)₂]phenyl |
| 53 | 1 | NHSO₂ | 2-furyl | 5-(i)C₃H₇CONH— | 4-[N(C₂H₅)₂]phenyl |
| 54 | 1 | NHCONH | CH₃ | 5-CH₃ | 4-OH-phenyl |

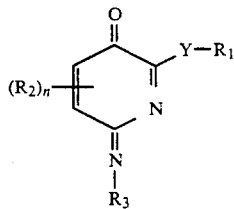

| No. | n | Y | R₁ | R₂ | R₃ |
|---|---|---|---|---|---|
| 55 | 2 | NHSO₂ | -(t)C₄H₉ | 4-Cl, 5-CH₃ | ![phenyl-N(C₂H₅)(CH₂CH₂OCH₃)] |
| 56 | 1 | NHCO | pyrrole (NH) | 5-C₂H₅ | ![phenyl-N(C₂H₅)(CH₂CH₂OH)] |

The numbers appearing before the R₂ substituent groups in the charts represent the substitution position in general formula (I).

The 3-hydroxypyridineazomethine dye represented by general formula (I) can be obtained through an oxidizing coupling reaction between for example a 3-hydroxypyridine and para-phenylenediamines or para-aminophenols, or a dehydration condensation reaction with a nitroso compound.

3-Hydroxypyridnnes are prepared by reacting together simultaneously or sequentially mono-, di- or tri-halogenopyridines with ammonia, mono-substituted amines, di-substituted amines, alcohols, phenols and thiols. Synthesis methods of 3-hydroxypyridines are disclosed in *Daiyuki Kaqaku (Organic Chemistry)*, Heterocyclic Compound [III], pages 1 to 126.

Preferred bases for the synthesis of 3-hydroxypyridines are for example sodium hydroxide, potassium hydroxide, pyridine, triethylamine, potassium t-butoxide, diazabicycloundecene, and sodium hydride, and, where amines are substituted, the amines may be used in excess without adding bases. Preferred reaction solvents are for example N,N-dimethylformamide, N,N-dimethylacetamide, N,N'-dimethyl-imidazolin-2-one, dimethyl sulfoxide, hexamethyl-phosphoryltriamide, acetonitrile, tetrahydrofuran, dioxane, diglyme, toluene, and xylene. The reaction temperature is from −78° C. to 200° C., and preferably within the range −20° C. to 160° C.

In the oxidizing coupling reaction between 3-hydroxypyridines and para-phenylenediamines or para-aminophenols, preferred oxidizers are for example silver nitrate, manganese dioxide, silver halide, ammonium persulfate, potassium persulfate, hydrogen peroxide, peroxides, N-bromosuccinimide, and chloramine-T, the reaction preferably being conducted under basic conditions. Preferred reaction solvents are water, methanol, ethanol, ether, ethyl acetate, methylene chloride, chloroform, toluene, tetrahydrofuran, and dioxane, or a combination of these. Preferred bases are for example sodium hydroxide, potassium hydroxide, sodium carbonate, potassium carbonate, and sodium hydrogen carbonate. The molar ratio of a 3-hydroxypyridine to para-phenylenediamine or para-aminophenol is preferably 1:0.5 to 2.0. Usually 0.1 to 20 equivalents, and preferably 0.5 to 10 equivalents of the base are used per equivalent of the para-phenylenediamine or para-aminophenol. 0.5 to 10 equivalents, and preferably 1 to 5 equivalents of the oxidizer are used per equivalent of the para-phenylenediamine or para-aminophenol. The reaction temperature is −78° C. to 100° C., and preferably −20° C. to 50° C. The concentration of the 3-hydroxypyridine in a solvent is preferably from 0.001 to 100 mol/l.

The base is added to a 3-hydroxypyridine solution, then p-phenylenediamine or a p-aminophenol is added to the solution, and then an oxidizer is added to the solution.

The reaction between the 3-hydroxypyridine and nitroso compound uses 0.1 to 3 equivalents, and preferably 0.5 to 2 equivalents of nitroso compound per equivalent of 3-hydroxypyridine, and is carried out in a solvent of for example methanol, ethanol, tetrahydrofuran, isopropanol, dioxane and acetic acid. The concentration of a 3-hydroxypyridine in the solvent is sually 0.001 to 100 mol/l. To catalyze this reaction an acid catalyst (for example, sulfuric acid, hydrochloric acid, phosphoric acid, para-toluenesulfonic acid, methanesulfonic acid, trifluoromethanesulfonic acid, trifluoroacetic acid, acetic acid) or a base catalyst (for example, sodium carbonate, potassium carbonate, sodium acetate, potassium t-butoxide, sodium methoxide, diazabicycloundecene) may be used in an amount of 0.001 to 10 equivalents, and preferably 0.1 to 5 equivalents per equivalent of 3-hydroxypyridine. A basic catalyst is preferred. The reaction temperature is −20° C. to 200° C., and preferably 0° C. to 150° C.

The invention will now be described in more detail based on examples of syntheses.

EXAMPLE 1

SYNTHESIS OF ILLUSTRATIVE COMPOUND 1

An aqueous solution (40 ml) of sodium carbonate (9 g) was added to a solution (100 ml) of 5-(2,4-di-t-amylphenoxy)-butanoylamino-3-hydroxy-2-(p-methoxybenzoylamino)pyrrodome (5.61 g, 10.0 mmol) in a mixed solvent of ethyl acetate and ethanol (1:1 volume ratio), following which was added 4-[N-ethyl-N-(2-methanesulfonamidoethyl)amino]-2-methylaniline sulfate (6.38 g, 12.2 mmol), with stirring for 5 minutes at room temperature. An aqueous solution (20 ml) of ammonium persulfate (4.5 g) was then dripped in, and after 1 hour of stirring, extraction was carried out 3 times using ethyl acetate. The organic layer was washed using a saturated aqueous solution of sodium chloride, and dried with anhydrous sodium sulfate. The solvent was removed under reduced pressure, and after purifying with column chromatography (development solvent, methylene chloride: methanol =20:1 volume ratio) Illustrative Compound 1 was recrystallized from methanol. (yield 7.45 g, 90%).

The structure of the compound was identified using element analysis, $^1$HNMR spectra and mass spectra (as was also done in the case of the following Examples). The melting point of the compound was 153° C. At a concentration of the compound in ethyl acetate of approximately $2.0 \times 10^{-5}$ mol/l, the maximum absorption strength $\lambda$max and molecular extinction coefficient $\epsilon$ were respectively as follows:

$\lambda$ max: 621.1 nm, $\epsilon$: 43500 l.mol$^{-1}$.cm$^{-1}$.

EXAMPLE 2

SYNTHESIS OF ILLUSTRATIVE COMPOUND 2

5-(2,4-di-t-Amylphenoxy) butanoylamino-2-benzoylamino-3-hydroxypyridine (5.31 g, 10.0 mmol) was reacted with 4-[N-ethyl-N-(2-methanesulfonamidoethyl)amino]-2-methylaniline sulfate (6.38 g, 12.2 mmol), in the same manner as in Example 1, purified, and recrystallized from methanol to yield Illustrative Compound 2 (5.99 g, 75%). The melting point was 154° C.

$\lambda$ max: 623.3 nm, $\epsilon$: 42100 l.mol$^{-1}$.cm$^{-1}$.

EXAMPLE 3

SYNTHESIS OF ILLUSTRATIVE COMPOUND 3

5-(2,4-di-t-Amylphenoxy)butanoylamino-2-(2-chlorobenzoyl)amino-3-hydroxypyridine (5.65 g, 10.0 mmol) was reacted with 4-[N-ethyl-N-(2-methanesulfonamidoethyl)amino]-2-methylaniline sulfate (6.60 g, 12.4 mmol), in the same manner as in Example 1, purified, and recrystallized from ethanol to yield Illustrative Compound 3 (6.57 g, 77%). The melting point was 150° C.

$\lambda$ max: 622.8 nm, $\epsilon$: 39800 l.mol$^{-1}$.cm$^{-1}$.

EXAMPLE 4

SYNTHESIS OF ILLUSTRATIVE COMPOUND 4

5-(2,4-di-t-Amylphenoxy)butanoylamino-2-(2,6-dichlorobenzoylamino)-3-hydroxypyridine (6.00 g, 10.0 mmol) was reacted with 4-[N-ethyl-N-(2-methanesulfonamidoethyl)amino]-2-methylaniline sulfate (6.33 g, 12.1 mmol), in the same manner as in Example 1, purified, and recrystallized from ethanol to yield Illustrative Compound 4 (6.24 g, 72%). The melting point was 155° C.

$\lambda$ max: 623.6 nm, $\epsilon$: 35200 l.mol$^{-1}$.cm$^{-1}$.

EXAMPLE 5

SYNTHESIS OF ILLUSTRATIVE COMPOUND 5

2-Benzoylamino-5-t-butylylamino-3-hydroxypyridine (3.13 g, 10.0 mmol) was reacted with 4-[N,N-diethylamino]-2-methylaniline sulfate (5.25 g, 12.2 mmol), in the same manner as in Example 1, purified, and recrystallized from methanol to yield Illustrative Compound 5 (3.94 g, 68%). The melting point was 188° C.

$\lambda$ max: 624.4 nm, $\epsilon$: 51,000 l.mol$^{-1}$.cm$^{-1}$.

EXAMPLE 6

SYNTHESIS OF ILLUSTRATIVE COMPOUND 6

2.5-(Di-t-butyl)amino-3-hydroxypyridine (2.93 g, 10.0 mmol) was reacted with 4-[N,N-diethylamino)-2-methylaniline sulfate (5.42 g, 12.6 mmol), in the same manner as in Example 1, purified, and recrystallized from methanol to yield Illustrative Compound 6 (4.09 g, 73%). The melting point was 235° C.

$\lambda$ max: 617.2 nm, $\epsilon$: 51,000 l.mol$^{-1}$.cm$^{-1}$.

EXAMPLE 7

SYNTHESIS OF ILLUSTRATIVE COMPOUND 7

2-Benzoylamino-5-(2-hexyldecanoyl)amino-3-hydroypyridine (4.67 g, 10.0 mmol) was reacted with 4-[N-ethyl-N-(2-methanesulfonamidoethyl)amino]-2-methylaniline sulfate (6.54 g, 12.5 mmol), in the same manner as in Example 1, purified, and recrystallized from methanol to yield Illustrative Compound 7 (5.67 g, 77%). The melting point was 154° C.

$\lambda$ max: 613.6 nm, $\epsilon$: 46500 l.mol$^{-1}$.cm$^{-1}$.

EXAMPLE 8

SYNTHESIS OF ILLUSTRATIVE COMPOUND 6

An ethanol (50 ml) solution containing 2,5-(di-t-butyl)amino-3-hydroxypyridine (2.93 g, 10.0 mmol), 4-(N,N-diethylamino)-2-methyl-1-nitrosobenzene (1.92 g, 10.0 mmol), potassium carbonate (1.5 g, 11.0 mmol) was heat-refluxed for 5 hours. After adding water, extraction was carried out 3 times using ethyl acetate. The organic layer was washed using a saturated aqueous solution of sodium chloride, and dried with anhydrous sodium sulfate. The solvent was removed under reduced pressure, and after pyrifying with column chromatography (development solvent:methylene chlorid:-methanol =20:1 volume ratio) Illustrative Compound 6 was recrystallized from methanol (yield 3.15 g, 56%). The melting point, $\lambda$max and $\epsilon$ of the product were the same as those in Example 6.

The dyes according to the invention are useful as dyes for image-forming in silver halide color photographs, color electrophotographs, ink jet systems, thermo-sensitive transfer systems, printing and the like, or as filter dyes for silver halide color photographic materials, solid-state image pick-up tubes, or liquid crystal color televisions.

As is clear from the above description and synthesis examples, the dyes of the present invention can be prepared with a small number of process steps, and are superior in terms of ease and cost of preparation.

The dyes of the present invention have the desirable characteristics of excellent stability with respect to heat, as seen in the high melting points, and high molecular extinction coefficients.

While the invention has been described in detail and with reference to specific embodiments thereof, it will be apparent to one skilled in the art that various changes and modifications can be made therein without departing from the spirit and scope thereof.

What is claimed is:

1. A 3-hydroxypyridineazomethine dye represented by formula (I):

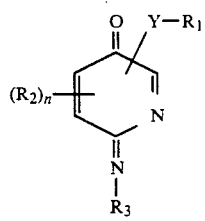

(I)

wherein $R_1$ represents an aliphatic group, an aromatic group, or a heterocyclic group; $R_2$ represents an aliphatic group, an aromatic group, a heterocyclic group, an alkoxy group, an aryloxy group, an alkenyloxy group, an amino group, an acyl group, a carbonyloxy group, an amido group, a sulfamoylamino group, an imido group, a ureido group, an aliphatic or an aromatic sulfonyl group, an aliphatic or an aromatic thio group, a hydroxyl group, a cyano group, a carboxy group, or a halogen atom; $R_3$ represents an aryl group; Y represents a bivalent linking group selected from the group consisting of

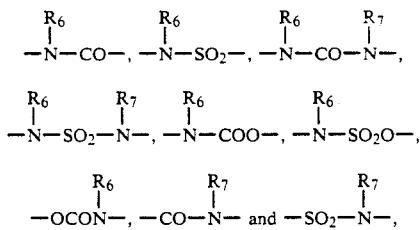

wherein $R_6$ and $R_7$ each represents a hydrogen atom or a substituted or unsubstituted aliphatic group, aromatic group or heterocyclic group; n represents 0, 1 or 2; where n is 2, the two $R_2$ groups may be the same group or atom or they may be mutually different groups or atoms, or the two $R_2$ groups may form a ring; where n is 1 or more, $R_1$ and $R_2$ may form a ring; and at least one of $R_1$ and $R_2$ may contain at least one residual group formed by removing $R_1$ or $R_2$ from formula (I), as a substituent.

2. The 3-hydroxypyridineazomethine dye as claimed in claim 1, wherein said aliphatic group represented by $R_1$ or $R_2$ is a saturated or unsaturated, unsubstituted aliphatic hydrocarbon straight chain, branched chain or ring or a saturated or unsaturated, substituted aliphatic hydrocarbon straight chain, branched chain or ring substituted with at least one substituent group selected from the group consisting of an alkyl group, an aryl group, a heterocyclic group, an alkoxy group, an aryloxy group, an alkenyloxy group, an amino group, an acyl group, a carbonyloxy group, an amido group, a sulfamoylamino group, a carbamoylamino group, an imido group, a ureido group, an aliphatic or an aromatic sulfonyl group, an aliphatic or an aromatic thio group, a hydroxy group, a cyano group, a carboxy group, a nitro group, a sulfo group and a halogen atom, and said substituents may be further substituted with at least one of these substituents.

3. The 3-hydroxypyridineazomethine dye as claimed in claim 1, wherein said heterocyclic group represented by $R_1$ or $R_2$ contains at least one three- to eight-membered ring containing at least one of O, S, N or P atom as a hetero atom, said ring may fuse together with one or more such three- to eight-membered rings or said ring or rings may fuse with a benzene ring, said three- to eight-membered ring or rings and said benzene ring may be substituted with at least one substituent group selected from the group consisting of an alkyl group, an aryl group, a heterocyclic group, an alkoxy group, an aryloxy group, an alkenyloxy group, an amino group, an acyl group, a carbonyloxy group, an amido group, a sulfamoylamino group, a carbamoylamino group, an imido group, a ureido group, an aliphatic or an aromatic sulfonyl group, an aliphatic or an aromatic thio group, a hydroxy group, a cyano group, a carboxy group, a nitro group, a sulfo group and a halogen atom, and said substituents may be further substituted with at least one of these substituents.

4. The 3-hydroxypyridineazomethine dye as claimed in claim 1, wherein said aromatic group represented by $R_1$ or $R_2$ is substituted with at least one substituent group selected from the group consisting of an alkyl group, an aryl group, a heterocyclic group, an alkoxy group, an aryloxy group, an alkenyloxy group, an amino group, an acyl group, a carbonyloxy group, an amido group, a sulfamoylamino group, a carbamoylamino group, an imido group, a ureido group, an aliphatic or an aromatic sulfonly group, an aliphatic or an aromatic thio group, a hydroxy group, a cyano group, a carboxy group, a nitro group, a sulfo group and a halogen atom, and said substituents may be further substitued with at least one of these substituents.

5. The 3-hydroxypyridineazomethine dye as claimed in claim 1, wherein a 5-7 membered ring is formed by $R_1$ and $R_2$ or by $R_2$ by itself, said ring may be a carbon ring or a ring containing at least one of N and O atoms, and may be either aromatic or non-aromatic.

6. The 3-hydroxypyridineazomethine dye as claimed in claim 1, wherein the dye of formula (I) is represented by formula (II):

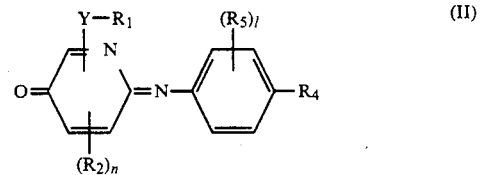

(II)

wherein $R_1$, $R_2$, Y and n have the same meaning, respectively, as in formula (I), $R_4$ represents a substituted or unsubstitued amino group or hydroxyl group, $R_5$ represents a halogen atom, an alkyl group, or alkoxy group, a carbonamido group, a sulfonamido group, or an alkoxycarbonylamino group, and l is an integer from 0 to 4.

7. The 3-hydroxypyridineazomethine dye as claimed in claim 1, wherein Y is —NHCO—.

8. The 3-hydroxypyridineazomethine dye as claimed in claim 1, wherein $R_1$ represents an alkyl group having 1 to 5 carbon atoms, a phenyl group, a phenyl group substituted with an alkoxy group having 1 to 5 carbon atoms or a halogen atom.

9. The 3-hydroxypyridineazomethine dye as claimed in claim 1, wherein $R_2$ is a substituted or unsubstituted acylamino group derived from an acyl group having 2 to 20 carbon atoms.

10. The 3-hydroxypyridineazomethine dye as claimed in claim 1, wherein $R_3$ represents a p-N,N-dialkyl-substituted amino phenyl group or a p-hydroxyphenyl group, said alkyl group may be substituted and said phenyl group may be substituted with an alkyl group having 1 to 4 carbon atoms.

11. The 3-hydroxypyridineazomethine dye as claimed in claim 1, wherein $R_3$ represents
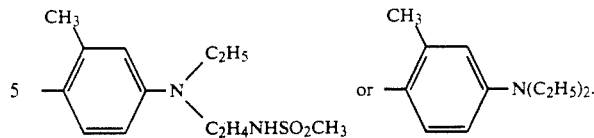
12. The 3-hydroxypyridineazomethine dye as claimed in claim 1, wherein —Y—$R_1$ is bonded at 2-position of the ring of formula (I).
* * * * *